United States Patent [19]

Lamb

[11] 4,342,592
[45] Aug. 3, 1982

[54] NON-POLLUTING PROCESS FOR RECOVERY OF PRECIOUS METAL VALUES FROM ORES INCLUDING THOSE CONTAINING CARBONATE MATERIALS

[75] Inventor: Frank E. Lamb, Tucson, Ariz.

[73] Assignee: Duval Corporation, Houston, Tex.

[21] Appl. No.: 174,408

[22] Filed: Aug. 1, 1980

Related U.S. Application Data

[63] Continuation-in-part of Ser. No. 58,864, Jul. 19, 1979, abandoned.

[51] Int. Cl.³ .............................................. C22B 11/06
[52] U.S. Cl. .............................. 75/118 R; 75/101 R; 75/114; 423/38; 423/40
[58] Field of Search ....................... 75/101 R, 109, 114, 75/118 R; 423/38, 39, 40, 491

[56] References Cited

U.S. PATENT DOCUMENTS

| | | | |
|---|---|---|---|
| 541,374 | 6/1895 | Mierisch | 75/101 |
| 649,962 | 5/1900 | Smith et al. | 75/114 |
| 723,787 | 3/1903 | Trivick | 423/491 X |
| 753,822 | 3/1904 | Broadwell | 423/38 X |
| 3,545,964 | 12/1970 | Hansen | 75/101 R |

Primary Examiner—G. O. Peters
Attorney, Agent, or Firm—Millen & White

[57] ABSTRACT

A non-polluting chemical process for recovery of metals from metal containing ores or other solid materials by:
(1) Treating the ore with a large volume of an aqueous solution containing chloride and hypochlorite ions (lixiviant solution);
(2) Recovering the solubilized metal values from the lixiviant solution by cementation;
(3) Regenerating the hypochlorite ion by electrochemical means; and
(4) Recycling the lixiviant solution.

In certain instances, steps (3) and (4) may be omitted with hypochlorite ion being provided as makeup to the circuit from external sources. The process of this invention has been shown to be effective for use with ores containing carbonate and cyanicidic minerals, including calcite.

15 Claims, 7 Drawing Figures

Fig. 2

EFFECT OF ORE PARTICLE SIZE ON SILVER SOLUBILIZATION
(TEMP. · AMBIENT)

| TEST NO. | % (−) | *TYLER MESH | Ag EXTN % | Cl % | NaOCl % | nθ HR |
|---|---|---|---|---|---|---|
| 1 | 93 | 4 | 0.1 | 11.0 | 0.51 | 24 |
| 2 | 94 | 65 | 75.7 | 10.64 | 0.52 | 24 |
| 3 | 90 | 400 | 87.5 | 12.21 | 0.52 | 24 |

| *TYLER MESH | OPENING INCHES |
|---|---|
| 4 | 0.185 |
| 65 | 0.0082 |
| 400 | 0.0015 |

Fig. 3

SOLUBILITY OF SILVER AS A FUNCTION OF CHLORIDE ION CONCENTRATION
(ne · 4 HRS, TEMP · AMBIENT)
NaOCl · 0.52 %
·400 M PARTICLE SIZE

○ SAMPLE 1
□ SAMPLE 2

| TEST NO. | Cl⁻ % | Ag EXTN % |
|---|---|---|
| 4 | 12.21 | 87.0 |
| 5 | 6.98 | 72.9 |
| 6 | 3.90 | 65.9 |
| 7 | 0.86 | 28.0 |
| 8 | 0.77 | 25.2 |
| 9 | 12.04 | 86.8 |
| 10 | 5.68 | 74.6 |
| 11 | 2.77 | 67.1 |

Fig. 4

SOLUBILITY OF SILVER AS A FUNCTION OF NaOCl CONCENTRATION
(TEMP. AMBIENT, PARTICLE SIZE · 400 MESH)

| n⊖ | TEST NO. | NaOCl % | Cl⁻ % | Ag EXTN % |
|---|---|---|---|---|
| 3 DAYS | 12 | 0.00 | 9.64 | 4.3 |
| 4 HRS | 13 | 0.52 | 2.77 | 67.1 |
| 4 HRS | 14 | 1.50 | 2.32 | 80.4 |
| 4 HRS | 15 | 3.00 | 3.32 | 80.7 |
| 4 HRS | 16 | 0.00 | 0.00 | 0.5 |

Fig. 5

SOLUBILITY OF SILVER AS A FUNCTION OF REACTION TIME
(TEMP. - AMBIENT, NaOCl - 0.52%, 400 M PARTICLE SIZE,
12.21% CHLORIDE ION CONCENTRATION)

| TIME HRS | EXTN % |
|---|---|
| 1 | 89.4 |
| 2 | 91.8 |
| 3 | 91.8 |
| 4 | 91.8 |
| 6 | 94.1 |

Fig. 6A

NON-POLLUTING PROCESS FOR RECOVERY OF PRECIOUS METAL VALUES FROM ORES INCLUDING THOSE CONTAINING CARBONATE MATERIALS

CROSS-REFERENCE TO RELATED APPLICATIONS

This application is a continuation-in-part of U.S. Application Ser. No. 058,864, filed on July 19, 1979, now abandoned.

BACKGROUND OF THE INVENTION (1) Field of the Invention

This invention relates generally to a hydrometallurgical process for the production of precious metals, especially silver, from precious metal containing solid materials, especially refractory silver ores. As used herein the term "precious metal(s)" means one or more from the group consisting of silver, gold, and mixtures of silver and gold. In particular, this invention is concerned with the processing of ores containing additionally carbonates and oxidic minerals (also known to be cyanicides) which are not economically treatable by conventional methods. This invention is also concerned with the processing of ores in a cyclic process which avoids substantial discharge of process materials to the environment. In accordance with this invention, silver or gold is produced after processing the silver or gold bearing ore with solutions containing chloride and hypochlorite ions. The chloride/hypochlorite solution may be regenerated electrochemically and reused in the process, rather than being discharged.

(2) Prior Art

Cyanidation is currently the most widely used technique for recovery of silver and other precious metals from ores. However, many precious metal bearing ores contain significant quantities of materials called cyanicides, and therefore are not economically treatable by current techniques. The process of this invention is applicable to cyanicide containing silver ores. The process of this invention also avoids the toxicity problems inherent in the cyanidation technique.

The prior art teaches use of hypochlorous acid, of hypochlorite ion, as a source of generating chlorine gas, or as a pretreatment followed by conventional cyanidation techniques. The prior art does not teach or suggest use of a large volume of a solution containing both chloride ion and hypochlorite ion, under conditions not producing chlorine gas, as a lixiviant for precious metal containing solid materials. In fact the art appears to teach away from use of chloride/hypochlorite solutions. For example, Fink and Putnam, U.S. Pat. No. 2,283,198, indicates that solutions of chlorine are ineffective with ores containing calcite. Hendrickson and Dagson, U.S. Pat. No. 3,594,157, teaches precipitation of silver values with hypochlorite solutions, rather than solubilization of the silver thereby. Scheiner, et al., U.S. Pat. No. 3,639,925, employs hypochlorite solutions as a pretreatment, but must use conventional cyanidation techniques for efficient gold recovery. Scheiner, et al., U.S. Bureau of Mines Report of Investigations No. 7736, indicates that electrolytically generated hypochlorite ion in the presence of chloride ion produces only 34% silver extraction after extensive treatment. The cumulative teaching of the prior art appears to suggest that use of chloride/hypochlorite solution would not lead to an efficient process for hydrometallurgical extraction of silver values from their ores.

At the present time in the industry, hydrometallurgy generally employs cyanidation techniques, which generate extremely toxic wastes, which could constitute an extreme environmental and safety hazard. Moreover, the cyanidation technique is not applicable to ores containing significant quantities of calcium carbonate, such as calcite, and other cyanicitic minerals.

SUMMARY OF THE INVENTION

The object of the present invention is to provide a chemical method for treatment of precious metal bearing ores or other solid materials, including those containing carbonates and oxidic materials, whereby efficient extraction of the metal values may be obtained. An additional object of the present invention is to provide a hydrometallurgical process for extraction of precious metal values from the metal bearing ores whereby any adverse environmental impact is minimized. A further objective of this invention is to provide a process for extraction of silver wherein disposal of process liquors containing hazardous concentrations of toxic chemicals and/or reagents is eliminated. A further objective of this invention is to provide a viable method for processing certain ores and solid materials which have heretofore been untreatable for reasons of economy or technological limitations using existing methods and techniques because of chemical and/or physical complexity and/or inefficiency. More particularly, the objects of this invention are essentially complete dissolution of contained precious metal values, recovery of a marketable metal product, regeneration of the reagents and solutions used, and operation of the process in a cyclical manner in which substantial discard of process liquors is not required. Other objects and advantages of the present invention will appear from the following description, examples and claims.

It has been discovered that these objects can be accomplished and that the difficulties of prior art processes can be obviated by use of a process having three basic steps, which can be briefly described as metal solubilization, metal recovery and solution regeneration.

Details regarding application of the technology for the metal solubilization or leach stage of the process to specific ore materials are determined by the chemical and/or physical composition and complexity of each. Certain generalizations may be made although exceptions to each have been observed. For example, particle size of the ore material being treated appears to be a significant variable. For the specific silver ore materials utilized in testing the present process, the data indicate that approximately 90% of the feed should be finer than 0.005 inches, or pass through a Tyler 115 mesh sieve, if 80% silver solubilization is to be realized. Another important parameter is the concentration of hypochlorite ion in the process liquor stream. A serious decline in reactivity becomes apparent at levels below approximately 0.1% with no noticeable solubilization being effected at zero concentration. Effective solubilization requires alteration of the precious metal from its mineralogical form of residence in the ore material to a complex readily soluble in an aqueous solution. Equally important is provision of a solution compatible with the complex thus formed. For this process, the chloride ion, which enhances precious metal solubility, is used to provide a solution compatible complex. An additional variable of critical importance is the ratio of ore to lixiviant solution. Sufficient volume of solution must be employed to permit solubilization of the chloro-metal complex formed in treatment. A solution volume sufficient to produce a solubilized silver concentration of about 5 to about 20 parts per million (p.p.m.) has been found to be effective for silver ores. A solution concentration of 15 to 20 p.p.m. is preferred. Of course, solution volume must be adjusted in view of initial metal concentration in the ore or other solid material to achieve the desired final solution concentrations. In summary, extraction efficiency depends on the particle size, the ratio of solution to ore, the chloride ion concentration, and the hypochlorite ion concentration. Typical results for silver-bearing ores are discussed below for illustration, and not by way of limitation.

Silver extractions of approximately 89% were achieved after one hour of reaction time at ambient temperature, with a sodium hypochlorite concentration of 0.52 weight percent, a sodium chloride ion concentration of 12.21 weight percent, a minus Tyler 400 mesh particle size and an ore containing about 90 p.p.m. silver treated with sufficient solution to produce about 20 p.p.m. silver in the lixiviant solution. Extension of the reaction time to six hours resulted in an increase in extraction to 94.1%.

In the metal solubilization or ore leaching stage, the feed ore is preferably preground to essentially minus Tyler 400 mesh particle size. The preground ore is exposed to a leach solution containing hypochlorite ion as the active ingredient, along with a substantial chloride ion concentration which provides enhanced silver solubilization tolerance for the solution.

Pregnant liquor containing silver solubilized in the ore leaching step is treated with a metal electrochemically more positive than silver to recover the silver by cementation. Additionally, the metal selected for recovery of silver values from pregnant liquor should be only slightly or totally nonreactive with other solution components. It has been found that metallic zinc and/or iron are particularly suitable for this application. The metal may be added in large forms such as foil or sheets in a vat operation, but preferably a finely divided powdered metal is used in an agitated tank reactor system.

Metallic silver thus produced would be physically removed from the stripped liquor stream utilizing suitable solids-liquid separation devices. The metal may be considered as product from this portion of the process and be subjected to further purification if and as required by application of known techniques, such as electrorefining.

Although any source of hypochlorite ion may be employed in the process, provided the cation present does not interfere with the silver extraction, the sodium salt presently represents the most economical source of hypochlorite ion for use in the process liquor. If the process step of electrochemically regenerating hypochlorite concentration is employed, the cation selected must be one which does not form an insoluble hydroxide. Sodium hypochlorite may be produced by any of the methods known to those skilled in the art (for example, the reaction of chlorine gas with sodium hydroxide in aqueous solution to produce an aqueous solution containing sodium ions, hypochlorite ions and chloride ions). Internal solution regeneration calls for production of the sodium hydroxide and chlorine electrochemically, thereby permitting continuous cyclical process operation and eliminating discharge of the process liquor. The sodium hydroxide and chlorine are produced at the cathode and anode respectively of an electrolytic cell. By employing a cell wherein the anodic and cathodic solutions are allowed to mix, sodium hypochlorite may be generated in a single step.

If the electrochemical solution regeneration step is employed, other alkali metal hypochlorites may be substituted for the preferred sodium hypochlorite, such as lithium hypochlorite, potassium hypochlorite, rubidium hypochlorite, or cesium hypochlorite. If the electrochemical regeneration step is omitted, then alkaline earth hypochlorites such as magnesium hypochlorite, calcium hypochlorite, and calcium hypochlorite chloride [$Ca(OCl)Cl$] may also be employed. The chloride salt may have the same cation as the hypochlorite salt, or the chloride may be a salt of a different metal provided that the cation selected does not react with the other solution components. Thus any alkali metal chloride may be substituted for sodium chloride for electrochemical regeneration, and alkali or alkaline earth metal chlorides may be used if electro-chemical regeneration is not employed. Soluble chlorides of other metals may also be employed if the cation is inert to the other solution components.

Only small portions of the stripped liquor need be introduced as feed into the electrolysis unit for solution regeneration generally since hypochlorite ion consumption per liquor pass through the circuit is a small fraction of that contained in the solution. Operationally, this is advantageous since makeup sodium chloride can be used to saturate the cell feed liquor, thus lowering operating voltage, and effecting correspondent circuit economy thereby.

The above simplified description summarizes the basic process for treatment of a silver or gold bearing ore permitting simultaneous production of high grade silver or gold while utilizing continuous cyclic operation, thereby eliminating any requirement for discharge of process liquors. The sodium chloride/hypochlorite solution employed eliminates any necessity for handling or discharge of highly acidic or toxic materials, in marked contrast to the prior art.

The invention will be more specifically illustrated by reference to the following drawings and detailed examples, which are provided for illustration and not as limitations. It will be obvious to those skilled in the art that many modifications of the process described herein may be made without departing from the scope and spirit of the invention.

BRIEF DESCRIPTION OF THE DRAWINGS

In the accompanying drawings,

FIG. No. 1 is a simplified flow diagram for the recovery of silver values from silver bearing ore materials.

FIG. No. 2 is a graphical representation of data showing the effects of ore particle size on silver solubilization, other process parameters being constant. ($n\theta$ is the time of reaction.)

FIG. No. 3 is a graphical representation of data showing the effect of chloride ion concentration in the leach solution on silver solubilization, other process variables being constant.

FIG. No. 4 is a graphical representation showing the effect of hypochlorite ion concentration in the leach solution on silver solubilization, other process variables being constant.

FIG. No. 5 is a graphical representation of data showing the effect of reaction time on silver solubilization, other parameters being constant.

FIG. No. 6 is a flow diagram depicting a processing facility for recovery of silver values from silver bearing ore materials. For convenience of presentation, it has been divided into FIGS. 6A and 6B.

DESCRIPTION OF THE PREFERRED EMBODIMENTS

Figure 1:
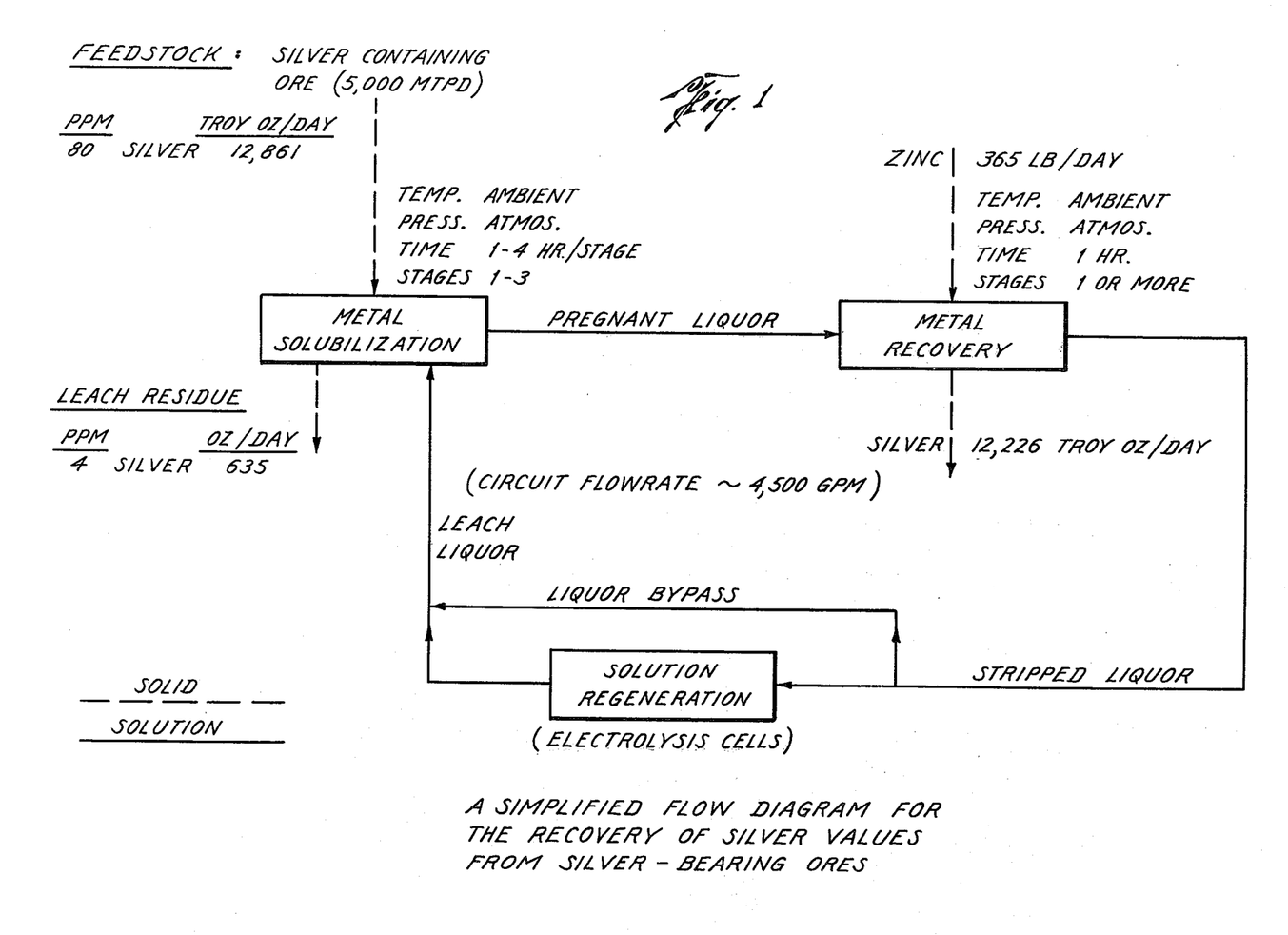
Figure 6A:
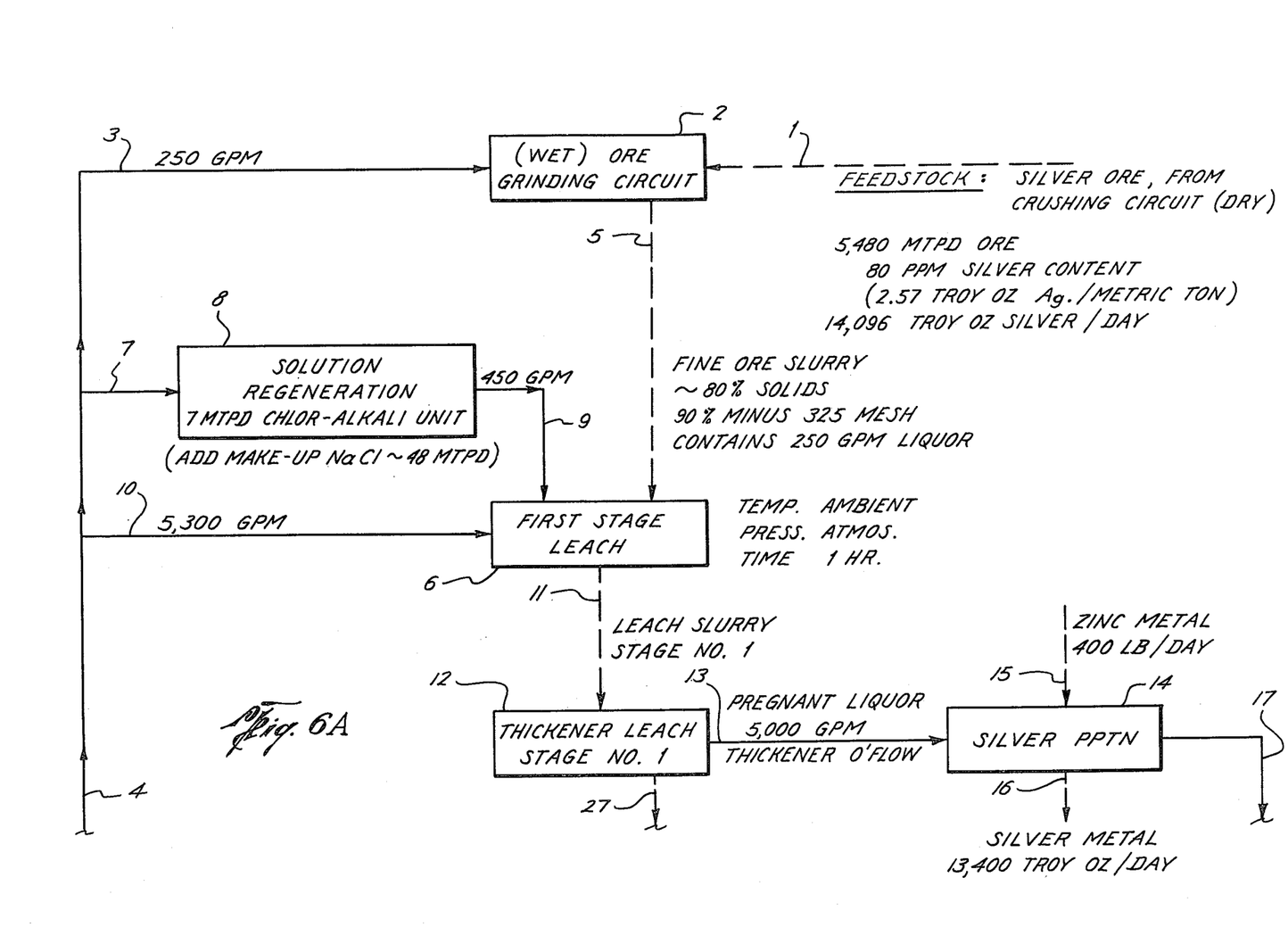
Figure 6B:
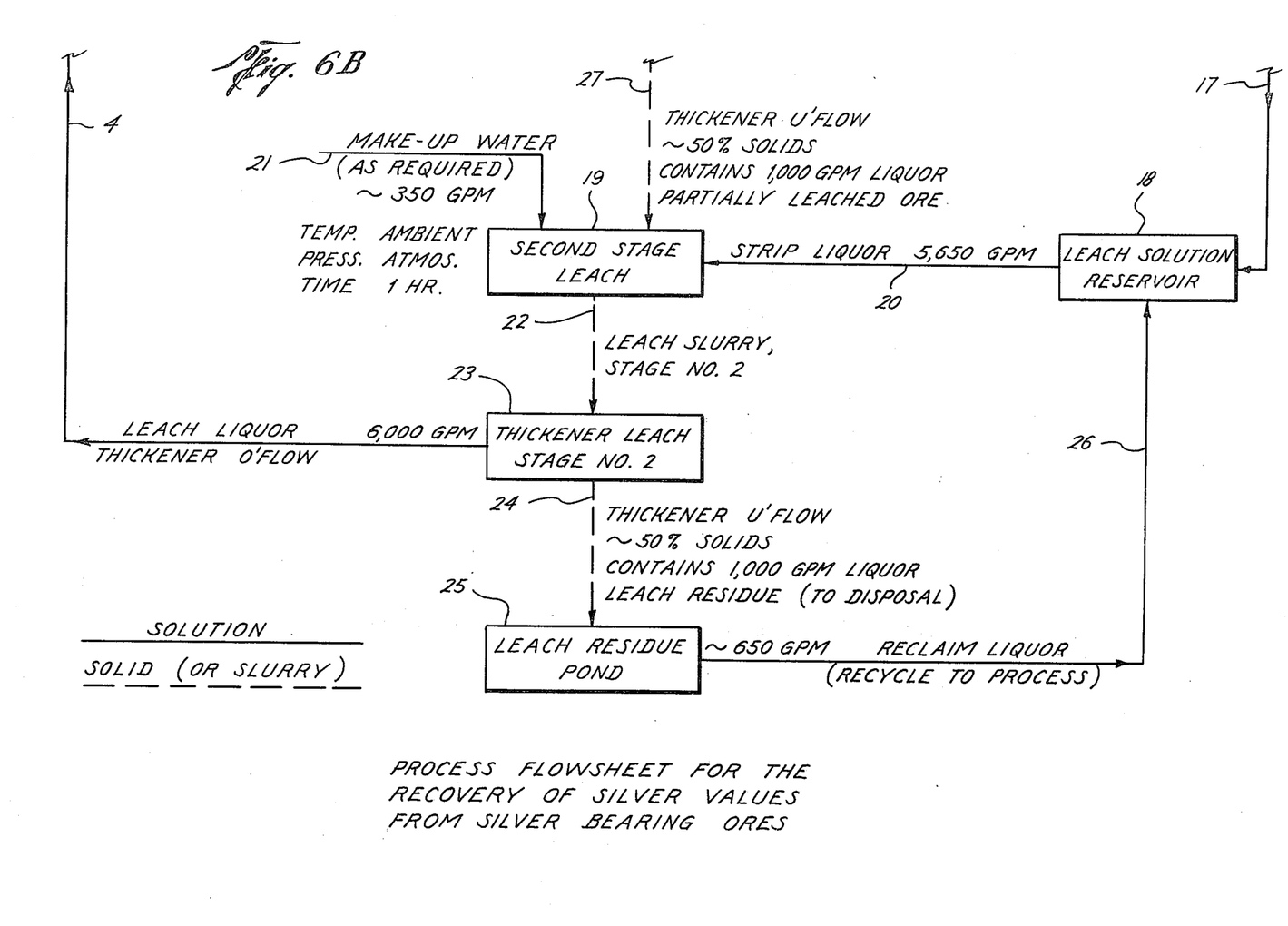

The basic process concepts for treatment of silver bearing ores will be readily understood from a study of the simplified flow diagram of FIG. No. 1 and the above process summary. For a more detailed understanding of the process of this invention, attention is invited to the flow sheet depicted in FIG. No. 6 and the following description.

The silver bearing ore investigated contained five distinct silver mineral occurrences. Silver was present in the following forms:

| | |
|---|---|
| Native Silver* | Ag |
| Argentiferous Pyrite* | $AgFe_2S_8$ |
| Cerargyrite | AgCl |
| Embolite | Ag(Cl, Br) |
| Argento Jarosite | $KFe_3(SO_4)_2(OH)_6$(with Ag) |

*Minor amounts only

Figure 3:
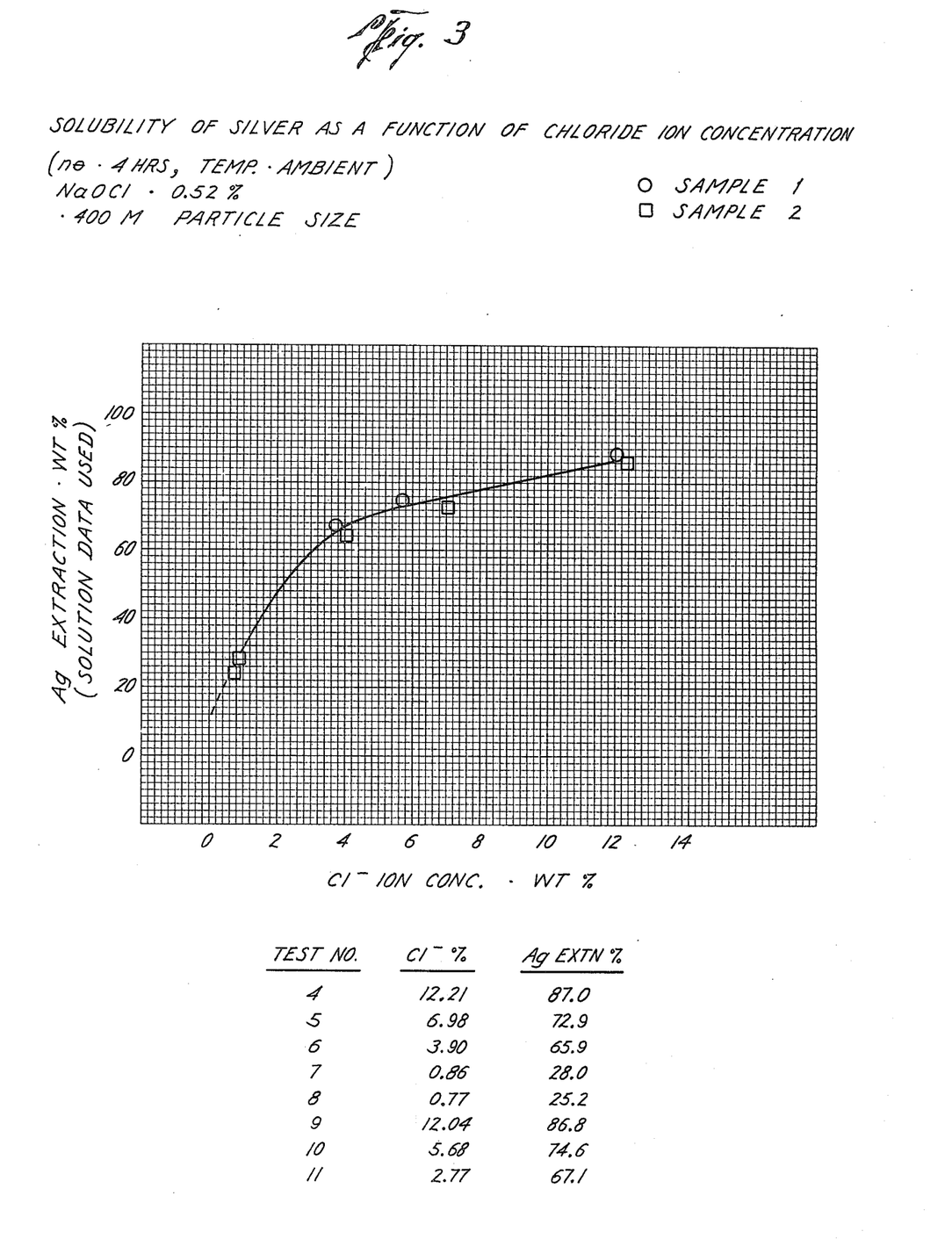
Figure 4:
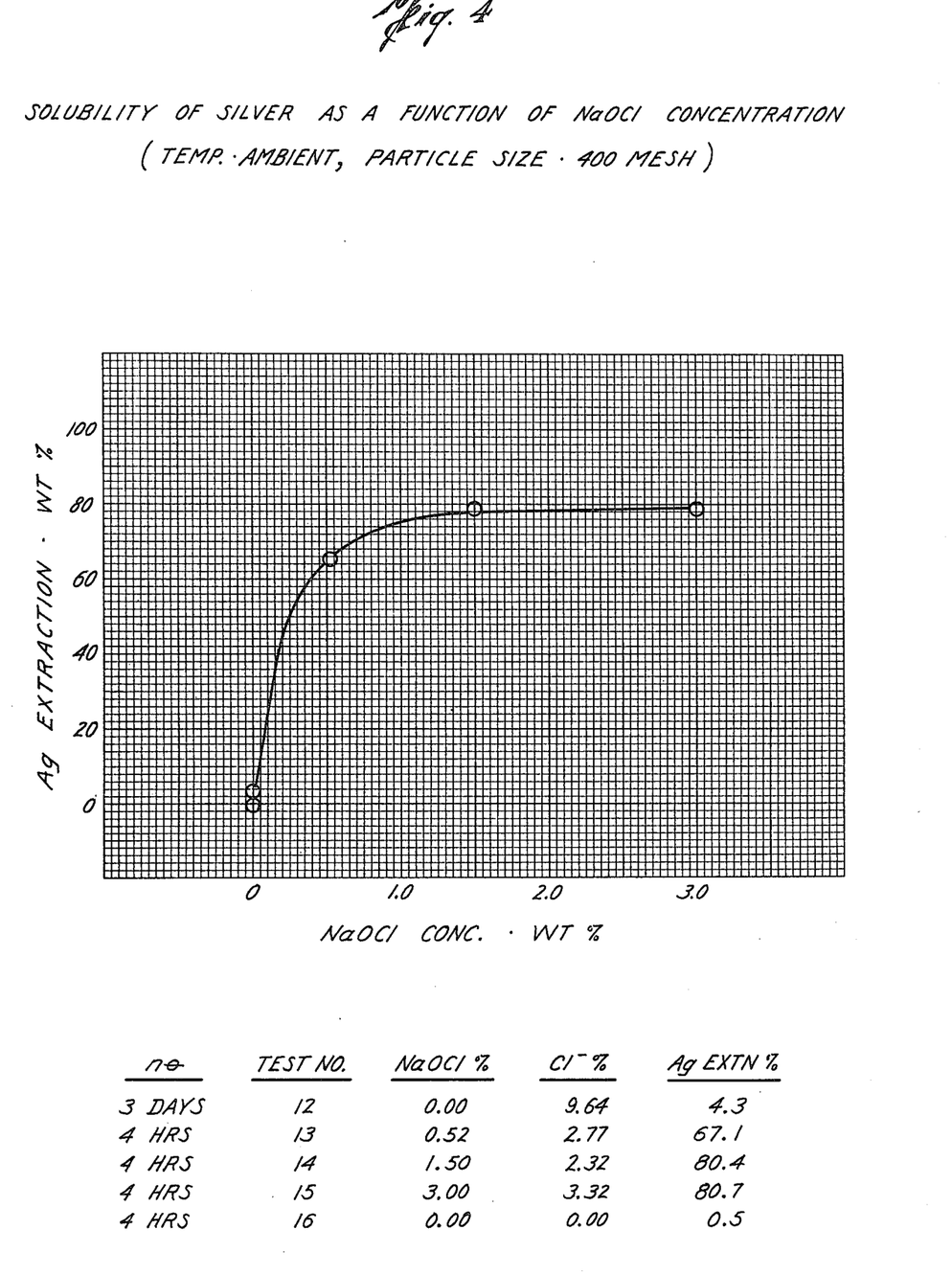

The nonsilver bearing materials present in the ore samples included quartz, feldspar, clay, hydrous iron oxide, and calcite. Also detected were tramp iron, barite, biotite, magnetite, limonite, chlorite, and pyrite. Ores of this type have previously been found not to be economically treatable by conventional cyanidation techniques, which is attributed chiefly to the deleterious effect of contained cyanicides. As the data depicted in FIGS. No. 3 and No. 4 illustrate, these ores were readily extracted by the process of the present invention.

Ore leach or metal solubilization reactions (lixiviation) may be most conveniently accomplished under conditions of ambient temperature and atmospheric pressure, although any temperature between the freezing point and boiling point of the solution may be employed, and elevated or reduced pressures may be applied if desired. Fine grinding, an aid to silver exposure and dissolution, also permits easy suspension of the ore particles in the lixiviating solution with minimal agitation power being required to maintain slurry homogeneity. Sufficient retention time should be provided in the first stage of the leach system to permit solubilization of the bulk of contained silver values, thus providing for separation of solubilized silver in the pregnant liquor from the leach residue by dilution in the subsequent leach stage(s).

Solubilization mechanisms for silver contained in the ore materials are dependent on the specific occurrence and may be as simple as provision of an appropriate aqueous media which will permit solubilization; for example, for such mineral species as cerargyrite and embolite, the chloride and chloride-bromide salts, respectively. Silver sorbed with jarositic and clay-type minerals may be desorbed or released by mass action of cations present in the lixiviating solution.

Silver structurally bound in sulfidic lattices is released on oxidation of the sulfide to sulfate by chemical reaction with hypochlorite of the leach solution. Such oxidative destruction of the sulfide may be expressed by the following equation:

$$S^= + 4[OCl]^- \rightarrow SO_4^= + 4Cl^-$$

Metallic ionic species released are then free to unite with chloride and sultate ions formed in the oxidation reaction mixture. In the specific instance for treatment of argentiferous pyrite, the released iron, having a very limited solubility in the solutions of this process, is hydrolytically deposited therefrom as a hydrated oxide with silver values remaining in solution as chloro complex ionic species.

Dissolution of native silver involves corrosive oxidation with subsequent formation of the soluble silver chloride by reaction of the newly formed oxide and the lixivant solution. Such sequential events may be expressed by the following set of equations:

$$H_2O + [OCl]^- + 2Ag^\circ \rightarrow 2Ag(OH) + Cl^-$$

$$Ag(OH) + Cl^- \rightarrow AgCl + OH^-$$

$$AgCl + \text{excess } Cl \rightarrow \text{soluble chloroargentate species}$$

Operationally, complete exclusion of contact between the process solution and air could be accomplished only with considerable difficulty and expense.

In general, the pH of the caustic leaching solution during the leaching step is 8-13.

Caustic solutions react readily with the carbon dioxide normally present in air to form a carbonate or bicarbonate from hydroxyl ion. Fortunately, the presence or formation of carbonate or bicarbonate does not interfere with the solubilization of silver in the process of this invention, thus eliminating the necessity for expensive and difficult measures to exclude air. The effect of carbonation on silver solubilization based on test results is set forth in Table 1 below:

TABLE 1

| Effect of Carbonation on Silver Solubilization | |
|---|---|
| Leach Solution Contains | Silver Extraction % |
| All hydroxide (OH) | 82 |
| 40% (OH) 60% ($CO_3$) | 76 |
| All carbonate ($CO_3$) | 84 |
| All bicarbonate ($HCO_3$) | 78 |
| | 80 (Average) |

Regeneration of hydroxyl ion by reacting the carbonated species using calcium hydroxide or lime, while not necessary, may be accomplished. Tests have shown that such regeneration solutions are equally effective for solubilization of silver values as indicated in Table 2 below.

TABLE 2

| Carbonate Removal, Lime Precipitation | |
|---|---|
| Lime Added (% of Theoretical) | Silver Extraction % |
| 80 | 81 |
| 110 | 82 |
| 160 | 81 |
| | 81 (Average) |

METAL SOLUBILIZATION

With reference to FIG. No. 6, silver containing ore having previously been mined and precrushed to suitable size is introduced via line 1 to ore grinding circuit 2. A quantity of water is admixed with and forms a slurry of the feed ore to facilitate size reduction. The ore-grinding circuit may well be equipped with closed circuit recycle of ore material not properly ground on the first pass. Devices normally considered adequate for such ore grinding service include rod and ball mills with the specific selection dependent on ore hardness and grinding characteristics, as are well known to those skilled in the art.

Size reduction, while vital and necessary for proper solubilization of silver in the metal solubilization stage for the ore types examined to date, is not considered an integral part of the process of this invention, since conceivably certain ores may be found or later discovered which are amenable to treatment via the instant process, but for reasons of physical makeup are not entirely or even partially dependent on such pretreatment.

The invention may be employed with standard reactors, lines, pumps, and the like commercially available, and selected according to the demands of the specific application. The selection and sizing of such equipment will of course be made by the standard techniques well known to those skilled in the art.

In the particular example of the application of this invention cited in FIG. No. 6, the finely ground ore material is introduced into the first stage leach reactor 6 through line 5. Lixiviating solution is introduced into the reactor 6 using line 9 after having been previously treated in solution regeneration unit 8. In unit 8, a portion of the circulating process liquor is treated by the addition and dissolution of a suitable quantity of makeup sodium chloride, and then serves as feed to a suitable electrolysis cell 8a. In this cell 8a, hypochlorite ion is formed either by direct electro-oxidation or by electrochemical formation of sodium hydroxide and chlorine, which are subsequently reacted together in a suitable contact reactor. The specific method for hypochlorite generation may utilize any of the standard techniques, and equipment available commercially, as is well known to those skilled in the art.

In the first stage leach reactor 6, the ore materials are allowed to react with hypochlorite ions. Subsequent interaction with chloride ions of the lixiviating solution may result in destruction of sulfidic minerals and, by corrosive oxidation of the silver content, silver chloride as described above. Cations such as sodium, present in the leach liquor, may replace silver held by clay and/or jarositic type minerals by mass action, releasing the silver as silver chloride. The exposed silver chloride and chloride-bromide minerals such as cerargyrite and embolite, respectively, along with the chloride formed as indicated above, are taken into solution, together with sufficient additional quantities of process liquor being introduced through line 10, to fulfill the solubility requirements based on the quantity of silver to be solubilized and the solution acceptance level therefor. The selection of specific volumes of solution and concentrations of reagents will of course depend on the characteristics of the specific ore to be treated.

The data graphically illustrated in FIG. Nos. 3 and No. 4 present the effects of chloride ion concentration and hypochlorite ion concentration on the extraction of silver from ore of a type not amenable to processing by conventional cyanidation techniques. The data in FIG. No. 3 indicate that in the presence of sodium hypochlorite at 0.52 weight percent, extraction of about 50% of the silver would be expected with a chloride ion concentration of about 2.1% by weight, whereas extraction improves to about 87% silver recovery when about 12% by weight chloride ion is present. As these data indicate, a wide range of chloride ion concentrations (from less than 1% by weight to near saturated solutions) may be effectively utilized, but preferably in the range of about 5% to about 20% by weight, more preferably in the range of 10% to 15% by weight.

With reference to FIG. No. 4, it can be seen that a wide range of hypochlorite concentrations may also be used; however, the data indicate that above 1.5 weight percent any increase in hypochlorite concentration results in very small increases in the amount of silver recovered. Therefore the preferred range of hypochlorite concentration is in the range of about 0.25% to about 2%, more preferably in the range of 0.5% to –1%, and generally 0.4 to 1.60% by weight.

Figure 5:
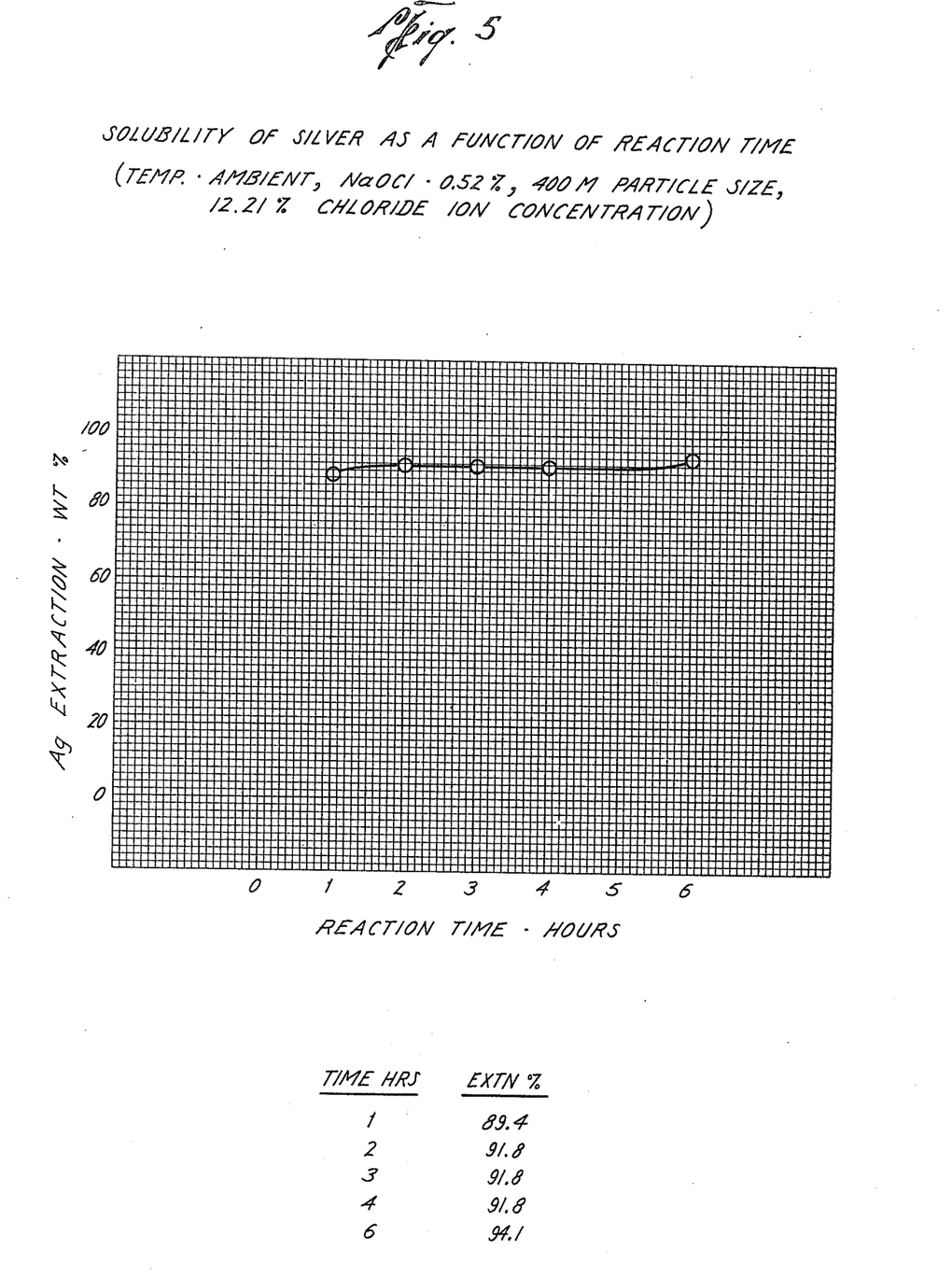

Sufficient retention time should be allowed in the reaction vessel 6 of the first stage leach to permit substantial completion of the silver solubilization reactions. With reference to FIG. No. 5, one hour for the ore treated in this example was reasonable and adequate. Other ore types may require adjustment of the reaction time; however, as the data of FIG. No. 5 indicate, the reactions are relatively rapid, with only slight increases in yield being noted for time periods beyond one hour. Therefore reaction times in the range of 0.5 hours to 1.5 hours will be suitable for treatment of most ore types. Solubilization reactions may be expected to continue as long as the ore material is contacted with reactive process liquor, as for example, in the solids-liquid separation device 12 illustrated in FIG. No. 6. Most of the solubilized silver is contained in the pregnant liquor retrieved from the solids-liquid separation device 12, with minimal extraction or solubilization remaining to be accomplished by succeeding leach stages. Subsequent leach stages may be omitted entirely if preferred, or multiple leach stages may be employed if, for example, it is desired to utilize lower concentrations of reagents with multiple steps to obtain an acceptable overall efficiency. The reaction slurry is transferred from the first stage leach reactor vessel 6 through line 11 to feed the solids-liquid separation device 12. The reaction slurry is therein separated with approximately 83% of the leach liquor (containing solubilized silver values) reporting as pregnant liquor to the metal recovery stage via line 13, and the balance retained with the leached solids serving as feed to the second leach stage reactor 19 via line 27. If subsequent leach stages are omitted, a solids-liquid separator of greater efficiency may be employed to separate substantially all of the pregnant liquor, or washing of the residue may be employed to enhance solution separation and recovery.

The second stage leach reactor 19 provides for a small incremental addition to the silver solubilized from the ore feed stock, but is primarily intended to provide for dilution of the silver values already in solution accompanying the leached solids received as feed from the first leach stage. Such dilution is accomplished by addition of circuit makeup water via line 21 along with essentially silver free process liquor from the metal recovery step via line 20.

Reaction slurry from the second stage leach reactor is discharged through line 22 providing feed for a solids-liquid separation device 23. Silver concentration in the processed liquor now has been diluted by uniformly mixing the pregnant liquor associated with leach solids from the first stage with approximately six times as much liquor and water essentially free of silver content.

Thus the liquor associated with leach residue being passed to disposal pond 25 via line 24 contains only a very small portion of the silver values solubilized from the ore. Much of this amount may be recovered from the leach residue as it settles to ultimate density during a long residence period in the pond. The retrieved liquor from such residue settling may be recycled to the process via line 26 to the leach solution reservoir 18 either directly, or more preferably, first to the metal recovery section for removal of contained silver values therefrom. Thickener overflow liquor is recycled via process line 4 to the ore grinding circuit 2 via line 3, to solution regeneration circuit 8 via line 7, and to the first stage leach reactor 6 via line 10. Recovery of better than 98% of the solubilized silver values may be anticipated using the above described plant circuit for application of the process of this invention. Other physical circuitry may be designed and utilized having correspondingly high recovery levels; however, the one described appears to represent minimal capital investment and operating costs.

METAL RECOVERY

Pregnant liquor generated in the metal solubilization stage and containing dissolved silver extracted from the ore feedstock overflows thickener 12, providing feed to metal recovery section 14 via line 13. For the example depicted in FIG. No. 6A, flow rate for this stream is approximately 5000 gallons per minute with nominal silver composition at 2.7 troy ounces per thousand gallons. With a solution density of approximately 9.67 pounds per gallon, the silver concentration may be expressed as about 19.2 parts per million.

Metals more electropositive than silver will react with the ionic species of silver present in the pregnant liquor removing it therefrom by causing deposition known in the art as cementation. Although any more electropositive metal might be utilized for this reaction, depending on local availability, the preferred metals will generally be iron or zinc (see line 15), and the cementation sequence may be considered with terminal conditions being represented by the following equations:

$Fe^\circ + 2Ag^+ \rightarrow Fe^{++} + 2Ag^\circ$ $Zn^\circ + 2Ag^+ \rightarrow Zn^{++} + 2Ag^\circ$ Tests were conducted wherein such silver containing liquors were caused to react separately with metallic powders of iron and zinc metal. Such examinations were performed under conditions in which the powered metals were suspended by agitation in the pregnant liquor for a period of 15 minutes at ambient temperature conditions. Final silver composition of the exposed solution and corresponding precipitation thereof for each metal is summarized in Table 3 below.

TABLE 3

| Precipitant | Recovery of Silver by Cementation | |
|---|---|---|
| | Final Silver Composition-PPM | Silver Recovery % |
| Iron | 1.30 | 93 |
| Zinc | 1.34 | 93 |

Economics dictate that the precipitant metal selected not only have the ability to recover metallic silver from solution, but have a very low reactivity therewith. The reaction of a metal with an oxidizing solution such as one containing hypochlorite ion is invariably an oxidation/reduction type in which the metal is oxidized from a valence of zero, and the oxidant is destroyed or consumed, wholly or partially. Such a reaction may be monitored by following the EH or oxidation-reduction potential of the solution during such a reaction. Again with reference to the tests cited in Table 3 above, solution EH values were recorded for the feed and stripped liquors with negligible differences being noted (as shown in Table 4) indicating negligible oxidation-reduction reaction involvement.

TABLE 4

| | Metal Reaction, Silver Cementation | |
|---|---|---|
| | Solution EH (Mv) | |
| Precipitant | Pregnant | Stripped |
| Iron | 731 | 720 |
| Zinc | 772 | 766 |

Either precipitant has been shown, therefor, to be equally effective for removal of silver from pregnant liquor. Utilization of this liquor as diluent to the second leach stage, together with anticipated recovery of solution from the leach residue pond as the final solid settles to ultimate density, should result in higher than 98% recovery of silver values extracted in the metal solubilization reaction. Low silver liquor exits metal recovery reactor 14 through line 17 and is retained in leach solution reservoir 18 for reuse in the process. Silver metal product is separated from the liquor via line 16. Further refining of this product metal can be accomplished using standard techniques as, for example, anode casting followed by electrodeposition, or other techniques known to those skilled in the art.

SOLUTION REGENERATION

A portion of the recycle process liquor stream from line 4 overflowing the second leach stage solids-liquid separation device 23 is withdrawn through line 7 to provide feed for a solution regeneration unit. A suitable dissolver, not shown, may be used for addition of makeup sodium chloride to the process solution, increasing liquor electrical conductivity and thus lowering the voltage requirement while enhancing performance of the chlor-alkali electrolytic cells 8 used for hypochlorite ion concentration regeneration. Any commercially available or similar chloro-alkali electrolytic cell may be utilized for this purpose.

Figure 2:
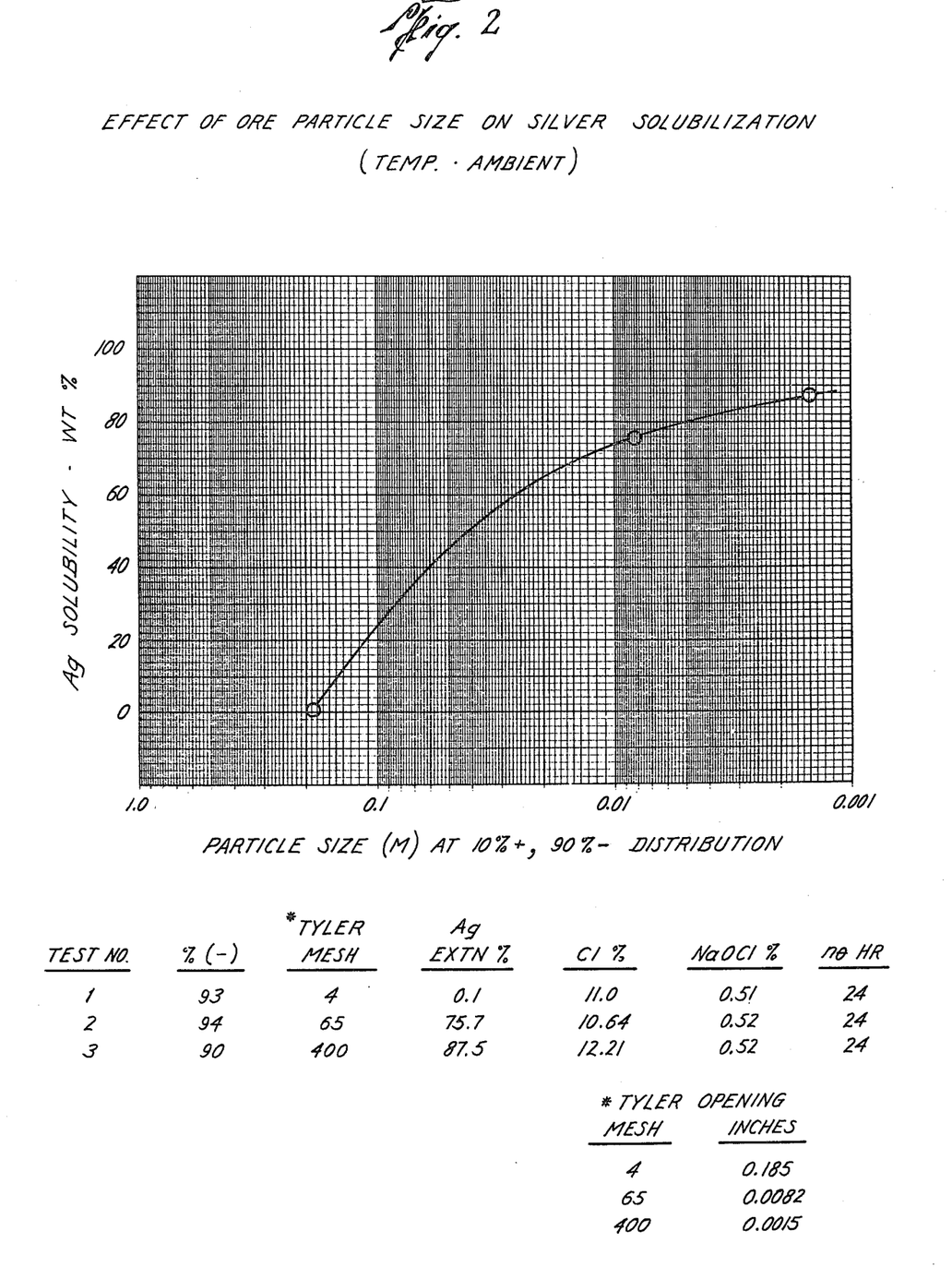

Solution regeneration is accomplished by electrolysis of the sodium chloride solution to the extent that hypochlorite ion concentration is maintained at a desirable level in the liquor for the first leach stage 6, as illustrated by the concentration ranges graphically depicted in FIG. No. 4. Regenerated solution exits the solution regeneration unit via line 9 to first stage leach reaction vessel 6, thereby allowing cyclic operation of the process. While electrolytic regeneration of the hypochlorite solution is generally preferable, this step may be omitted and solution regeneration accomplished by addition of makeup hypochlorite obtained from external sources. As the data of FIGS. No. 2 thru No. 5 indicate, variables such as particle size, chloride ion concentration, hypochlorite ion concentration, and reaction time may be varied within a wide range, and essentially independently, as required for treatment of various ore types. As indicated by FIG. 2, particle size of the ores studied has a dramatic effect on extraction efficiency. Therefore for most ores particle size will need to be relatively small, preferably passing a Tyler 65 mesh screen, and more preferably passing a Tyler 400 mesh screen.

Many variations in the selection of equipment for the process depicted in FIG. No. 6 are possible. Leach reaction vessels 6 and 19 are preferably agitated reaction vessels. Selection of particular vessels, volumes, and throughputs will depend on the particular type and quantity of ore desired to be treated, and factors such as capital investment considerations and local conditions. Additional leach stages may be employed advantageously, particularly if it is desired to keep solution reagent concentrations low and utilize multiple leaching stages to achieve overall high efficiency of silver recovery. These and similar variations are deemed to be within the scope and spirit of the above described invention. The practice of this invention is not limited to the use of any special equipment. The stages and process steps described herein may be conducted on a batch or continuous basis and in any appropriate conventional equipment (including, for example, reactors, containers, and vessels which may be open or closed to the atmosphere by conventional means). Moreover, each stage or step as described herein may be conducted in one or more reactors, vessels or containers. The use of available compartmented, divided or segmented units of equipment is also within the contemplation of this invention.

What is claimed is:

1. A cyclical hydrometallurgical process for production of a precious metal from a precious metal-containing solid material which consists essentially of:
   (A) contacting the precious metal-containing material with an effective volume of a caustic leaching solution whose leachants consist essentially of an effective concentration of a hypochlorite salt and an effective concentration of a chloride salt ion for a sufficient time to solubilize the precious metal;
   (B) depositing the precious metal by displacement of the precious metal with a more electropositive metal to produce a stripped solution;
   (C) adding sufficient hypochlorite to the stripped solution to maintain an effective concentration of hypochlorite salt therein; and
   (D) recycling the stripped caustic solution to contact additional precious metal-containing material.

2. The hydrometallurgical process of claim 1 wherein the metal-containing solid material is passed through a plurality of such metal solubilization contacting steps (A).

3. The hydrometallurgical process of claim 1 for solubilization of silver, gold or a mixture thereof from solid material containing the same,
   wherein the contacting of the solid material is performed with an effective volume of a caustic aqueous solution consisting essentially of water; an effective concentration of sodium hypochlorite, potassium hypochlorite, lithium hypochlorite, magnesium hypochlorite, calcium hypochlorite or a mixture thereof; and an effective concentration of sodium chloride, potassium chloride, lithium chloride, magnesium chloride, calcium chloride or a mixture thereof.

4. The process of claim 3 wherein the aqueous solution contains sodium hypochlorite and sodium chloride.

5. A hydrometallurgical process for production of metallic silver from a silver-containing material which consists essentially of:
   (A) contacting the silver-containing material with a volume of a caustic leaching solution whose leachants consist essentially of an effective concentration of a hypochlorite salt and an effective concentration of a chloride salt in a volume of water sufficient to produce a final solution concentration of 5 to 20 parts per million of solubilized silver contained therein;
   (B) agitating the silver-containing material with the caustic solution for a period of time sufficient to allow substantially complete solubilization of the silver;
   (C) separating a solubilized silver-containing solution from a residual material resulting from step (B);
   (D) contacting the solubilized silver-containing solution with iron, zinc or a mixture thereof, in a sufficient quantity to cause deposition of the solubilized silver leaving a stripped solution;
   (E) separating the stripped solution from the deposited silver;
   (F) passing a portion of the stripped solution to an electrolysis cell to regenerate the hypochlorite ion concentration in the caustic solution;
   (G) recycling the remainder of the caustic stripped solution to again contact silver-containing material; and
   (H) passing the regenerated portion of the stripped caustic solution to contact additional silver-containing material.

6. The process of claim 5 wherein the residual material from step (C) is again contacted with a caustic solution whose leachants consist essentially of an effective concentration of a hypochlorite salt and an effective concentration of a chloride salt in a volume of water sufficient to effect additional recovery of silver contained therein.

7. The process of claim 5 or 6 wherein additional chloride salt is added to the portion of the stripped caustic solution passed to the electrolysis cell in step (F) whereby the electrolysis is rendered more efficient.

8. The process of claim 1, 2, 3, 4, 5 or 6 wherein the hypochlorite salt concentration is in the range of 0.25 to 2.00 percent by weight.

9. The process of claim 1, 2, 3, 4, 5 or 6 wherein the chloride salt concentration is in the range of about 5 to 20%.

10. The process of claim 1, 2, 3, 4, 5 or 6 wherein the hypochlorite salt concentration is in the range of 0.40 to 1.6 percent by weight and the chloride salt concentration is in the range of 10 to 15 percent by weight.

11. The process of claim 1, 2, 3, 4, 5 or 6 wherein the pH of the caustic leaching solution during the leaching step is 8-13.

12. The process of claim 7 wherein the pH of the caustic leaching solution during the leaching step is 8-13.

13. The process of claim 8 wherein the pH of the caustic leaching solution during the leaching step is 8-13.

14. The process of claim 9 wherein the pH of the caustic leaching solution during the leaching step is 8-13.

15. The process of claim 10 wherein the pH of the caustic leaching solution during the leaching step is 8-13.

* * * * *